(12) United States Patent
Kuttyamu (10) Patent No.: US 12,136,897 B2
(45) Date of Patent: Nov. 5, 2024

(54) ENERGY EFFICIENT MOTOR-GENERATOR (71) Applicant: PAL-K Dynamics Inc., Dover, DE (US)

(72) Inventor: Kunjimon Thekypeedikayil Kuttyamu, Kerala (IN)

(73) Assignee: PAL-K Dynamics Inc., Dover, DE (US)

( * ) Notice: Subject to any disclaimer, the term of this patent is extended or adjusted under 35 U.S.C. 154(b) by 205 days.

(21) Appl. No.: 17/875,120

(22) Filed: Jul. 27, 2022

(65) Prior Publication Data

US 2023/0044966 A1 Feb. 9, 2023

(30) Foreign Application Priority Data

Aug. 6, 2021 (IN) .............................. 202141035653

(51) Int. Cl.
H02P 7/347 (2016.01)
(52) U.S. Cl.
CPC .................................... H02P 7/347 (2016.02)
(58) Field of Classification Search
CPC ........................................................ H02P 7/347
USPC ........................................................ 318/158
See application file for complete search history.

(56) References Cited

U.S. PATENT DOCUMENTS

| 4,341,984 | A | 7/1982 | Parker et al. |
| 4,382,223 | A | 5/1983 | Hedges |
| 4,414,499 | A | 11/1983 | Hedges |
| 4,636,702 | A | 1/1987 | Hedges |
| 4,864,212 | A | 9/1989 | Parker |
| 6,489,742 | B2 | 12/2002 | Lumsden |
| 2002/0079859 | A1 * | 6/2002 | Lumsden ................ H02P 27/02 318/727 |

(Continued)

FOREIGN PATENT DOCUMENTS

| CN | 1323091 A | * | 11/2001 |
| CN | 201663527 U | | 12/2010 |

(Continued)

OTHER PUBLICATIONS

E. da Silveira et al., "Direct on Line Starting Induction Motor with Thyristor Switched Capacitor Based Voltage Regulation," 2009 Brazilian Power Electronics Conference, DOI:10.1109/COBEP.2009.5347707, Dec. 4, 2009, fig. 3, section II, pp. 1124-1125.

(Continued)

*Primary Examiner* — Kawing Chan
(74) *Attorney, Agent, or Firm* — Knobbe, Martens, Olson & Bear, LLP (57) ABSTRACT

The disclosure relates to an energy efficient motor-generator which includes a stator, a main winding (M) of the stator for generating a rotating magnetic field (RMF), and a rotor disposed to rotate relative to the main winding (M) of the stator due to the RMF. The stator further includes a first additional winding (F) for producing an alternating EMF and a second additional winding (E) for producing a corresponding alternating EMF due to the rotation of the rotor. The two alternating EMFs are harvested through an electronic control unit (ECU) interfaced to the stator for continuously supplying power for the working of the motor-generator and for supplying power to drive electrical loads, respectively.

26 Claims, 5 Drawing Sheets

(56) References Cited

U.S. PATENT DOCUMENTS

| | | | |
|---|---|---|---|
| 2002/0149331 A1 | 10/2002 | Marcinkiewicz | |
| 2007/0164701 A1 | 7/2007 | Wu | |
| 2017/0141633 A1 | 5/2017 | Atalla et al. | |
| 2022/0224267 A1* | 7/2022 | Kuttyamu | H02P 23/26 |

FOREIGN PATENT DOCUMENTS

| | | |
|---|---|---|
| DE | 102004041743 A1 | 3/2006 |
| IN | 202141001079 A | 7/2022 |
| JP | H0923637 A | 1/1997 |
| WO | WO2019/111145 A1 | 6/2019 |
| WO | WO2022/149155 A1 | 7/2022 |
| WO | WO2023/012825 A1 | 2/2023 |

OTHER PUBLICATIONS

Written Opinion of PCT Application No. PCT/IN2021/051145, dated Mar. 25, 2022, in 8 pages.
Written Opinion of PCT Application No. PCT/IN2022/050696, dated Nov. 9, 2022, in 5 pages.

\* cited by examiner

ENERGY EFFICIENT MOTOR-GENERATOR

FIELD

The systems and techniques disclosed herein generally relate to an energy efficient induction motor that also functions as a generator, and more specifically to an energy efficient motor-generator which consumes less current, compared to a conventional motor of the same capacity, by harvesting and manipulating the EMF generated in the stator windings, thus supplementing a major part of the power requirements for driving the motor-generator and also to supply power to drive electrical loads.

BACKGROUND

With the drastic increase in energy demand, various sectors, industrial or otherwise are looking to adopt sustainable forms of energy and to leverage renewable sources of energy. This is coupled with the need to provide energy efficient devices that manage, and conserve energy/power generated, to be on par with the energy requirements and demands.

With advancements in technology, electric motors have been used in industries as a main driving power in various applications, which demand excessive use of energy resources. Specifically, induction motors such as the three-phase induction motors are predominantly used in the industrial and agricultural sectors and these motors consume 65% of the total energy produced. Thus, there is a need to save a substantial amount of energy compared to the standard motors currently in use. Also, there is a need to reduce the running cost of such motors with improved efficiency to design an energy efficient motor.

There are basically two types of induction motor depending upon the type of input power supply to the motor and a type of rotor. Based on the type of input power supply, induction motors are classified as a single-phase induction motor and a three-phase induction motor. Based on the type of rotor, induction motors are classified as a squirrel cage motor and a slip ring motor or wound type.

The following is illustrative of the working principle of an inductor motor. When the stator winding of the induction motor is fed with an AC input power supply, alternating flux is produced around the stator winding due to the AC input power supply. This alternating flux revolves with synchronous speed. The revolving flux is referred to as the "Rotating Magnetic Field" (RMF).

The relative speed between the stator RMF and rotor conductors causes an induced electromotive force (EMF) in the rotor conductors, in accordance with Faraday's law of electromagnetic induction. The rotor conductors are short circuited, and hence rotor current is produced due to the induced EMF. Because of their operation mechanism, such motors are called as induction motors. This is similar to the action that occurs in transformers and hence induction motors are also referred to as rotating transformers.

The induced current in the rotor also produces an alternating flux around it. This rotor flux lags behind the stator flux. The direction of the induced rotor current, according to Lenz's law, is such that it will tend to oppose the cause of its production. As the cause of production of the rotor current is the relative velocity between the rotating stator flux and the rotor, the rotor will try to catch up with the stator RMF. Thus, the rotor rotates in the same direction as that of the stator flux to minimize the relative velocity. However, the rotor never succeeds in catching up with the synchronous speed of the rotating stator flux or the RMF. This is the basic working principle of both a single-phase and a three-phase induction motor.

In a three-phase induction motor, the three-phase supply is used to balance the consumption of high current. Hence, the three-phase supply is required to run an induction motor with a 3 HP rating and more.

Energy efficiency of electric motors especially the induction motors is a highly researched area. By increasing the efficiency of induction motors, it is possible to conserve tremendous amounts of energy. It is difficult to achieve industrial efficiency standards by using conventional design approaches for designing the induction motors.

Currently existing high efficiency induction motors incorporate high-quality core and winding materials to enhance the operating efficiency of the motor. Such design changes are not cost-effective. In the recent past, significant work and investment has been made on the energy-saving side instead of using high-quality material, with efforts being made to improve the electrical current efficiency of the electric motor by way of various design modifications.

In many cases, squirrel cage induction motors are preferred for fixed speed applications. However, due to predominant winding losses, current induction motors with an optimum efficiency are not commercially available. Use of amorphous core and copper rotor bars are other solutions that have been implemented for increasing efficiency, however, such solutions result in overall increase in cost and its implementation industry wide may not be feasible.

Electric motors are used as generators to drive different types of electrical loads that may include, but are not limited to, variable-torque loads (such as fans, pumps), constant-torque loads (such as reciprocating compressors, conveyors, screws) and constant power loads (such as machine tools). The energy output to drive these electrical loads is erratic and is affected owing to power restrictions, torque and speed limitations, and current and voltage limitations. In order to meet the torque requirements, a motor with a higher power rating than the generated power is required, particularly if the generator speed is very low compared to typical motor speeds. Furthermore, the torque of the motor-generator may be constrained by the size and type of the motor-generator. Therefore, a motor type with continuous torque that is higher than the generator torque is to be selected. To address the current and voltage limitations, appropriate windings of a given motor type that can generate the required voltage even under load is to be selected.

In conventional usage of a motor as a generator, mechanical energy is converted to electrical energy. This conversion is associated with several losses, such as mechanical losses, coupling losses, electrical losses, thermal losses, and magnetic losses. Thus, induction motors are rarely used as generators for practical applications, as induction motors generally have extremely low power output due to the aforementioned losses. An induction motor constructed with a permanent magnet can produce output with relatively higher efficiency, however the power output is still inadequate for certain applications.

Accordingly, in light of the foregoing difficulties, there exists a need for an energy efficient induction motor that will consume less current compared to any conventional motor of the same capacity and efficiently harvest the power generated by the motor for supplementing a major part of the power requirements for driving the motor and also to supply power to drive electrical loads.

Limitations and disadvantages of conventional and traditional approaches will become apparent to one of ordinary skill in the art, through comparison of described systems with some aspects of the present disclosure, as set forth in the remainder of the present application and with reference to the drawings.

SUMMARY

An energy efficient motor-generator is disclosed which consumes less current, compared to a conventional motor of the same capacity as shown in and/or described in connection with, at least one of the figures.

In one aspect, a motor-generator includes a stator comprising a main winding for generating a rotating magnetic field (RMF) upon providing a main AC power supply to the main winding of the stator and a rotor disposed to rotate relative to the main winding of the stator due to the RMF. The stator further includes two additional windings. A first additional winding, also referred to as a feedback EMF winding produces an alternating electromotive force (EMF) which is induced in the feedback EMF winding due to the rotation of the rotor. The alternating EMF produced in the feedback EMF winding is then harvested, manipulated and fed back to the main winding of the stator throughout the complete rotation cycle of the rotor through an electronic control unit (ECU) interfaced to the stator. The energy thus produced during the rotation of the rotor meets a major part of the energy requirement for the working of the motor-generator. A second additional winding in the stator, also referred to as an electrical load EMF winding, produces an alternating EMF which is induced in the electrical load EMF winding due to the rotation of the rotor. The alternating EMF produced in the electrical load EMF winding is then harvested through the ECU interfaced to the stator to supply power to an electrical load. The energy thus produced during the rotation of the rotor meets the energy requirements to drive the electrical load.

In another aspect, a method including generating a rotating magnetic field (RMF) in response to a main AC power supply using a main winding of a stator that is interfaced to an electronic control unit (ECU), rotating a rotor relative to the main winding of the stator in response to the RMF, inducing an alternating EMF in a first additional winding of the stator in response to the rotation of the rotor, feeding back the alternating EMF induced in the first additional winding to the main winding of the stator throughout a rotation cycle of the rotor, inducing an alternating EMF in a second additional winding of the stator in response to the rotation of the rotor, and harvesting the alternating EMF induced in the second additional winding through the ECU interfaced to the stator to supply power to an electrical load.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed energy efficient motor-generator. The motor-generator includes a stator comprising a main winding (M) for generating a rotating magnetic field (RMF) upon providing a main AC power supply to the main winding (M) of the stator and a rotor disposed to rotate relative to the main winding (M) of the stator due to the RMF. The stator further includes two additional windings namely a first additional winding (F) and a second additional winding (E). Each of the windings M, E and F may be multi-layered with single or multiple coils. Each coil may be made of a single core wire or multicore wires.

The first additional winding (F), also referred to as a feedback EMF winding (F) produces an alternating electromotive force (EMF) which is induced in the feedback EMF winding (F) due to the rotation of the rotor. The alternating EMF produced in the feedback EMF winding (F) is then harvested, manipulated and fed back simultaneously to the main winding (M) of the stator throughout the complete rotation cycle of the rotor through an electronic control unit (ECU) interfaced to the stator. The energy thus produced during the rotation of the rotor meets a major part of the energy requirement for the working of the motor-generator.

The ECU includes a feedback module, a control module and an input module for harvesting the alternating EMF produced in the feedback EMF winding (F). A rectifier in the ECU converts the AC power from the main AC power supply to DC power which is then fed to the control module. The alternating EMF produced in the feedback EMF winding (F) is fed to the feedback module which converts the AC power of the alternating EMF to DC power and feeds the DC power to the control module.

The control module is a component of the ECU that combines the input voltages of the main AC power supply and the feedback module to generate a resultant DC power. The control module checks the value of the input voltage from the feedback module against the desired operational voltage of the motor-generator. Accordingly, the control module adds the remaining voltage from the power obtained from the main AC power supply.

The resultant DC power from the control module is fed to the input module. The input module converts the resultant DC power to a resultant AC power, filters and feeds the resultant AC power to the main winding (M) of the stator.

The second additional winding (E) in the stator, also referred to as an electrical load EMF winding (E), produces an alternating EMF which is induced in the electrical load EMF winding (E) due to the rotation of the rotor. The alternating EMF produced in the electrical load EMF winding (E) is then harvested through the ECU interfaced to the stator to supply power to an electrical load. The energy thus produced during the rotation of the rotor meets the energy requirements to drive the electrical load. Electrical loads may include, but are not limited to, resistive, inductive or capacitive loads, AC, DC, or pulsating loads, or any combination of these loads that may be driven using the motor-generator 100. Different configurations of the motor-generator 100 may be used to produce different power outputs for varying applications.

The ECU includes the control module, an output module and an electrical load module for harvesting the alternating EMF produced in the electrical load EMF winding (E). The control module communicates with the output module and controls different components and circuits of the output module. The alternating EMF produced in the electrical load EMF winding (E) is fed to the output module which converts the AC power of the alternating EMF produced in the electrical load EMF winding (E) to DC power which charges and triggers a battery that may include, but is not limited to, a capacitor bank, a supercapacitor (such as, for example, a double layer copper capacitor) or any device that holds electrical charge, to supply power to the electrical load module which provides an electrical output to power an electrical load.

Figure 1:
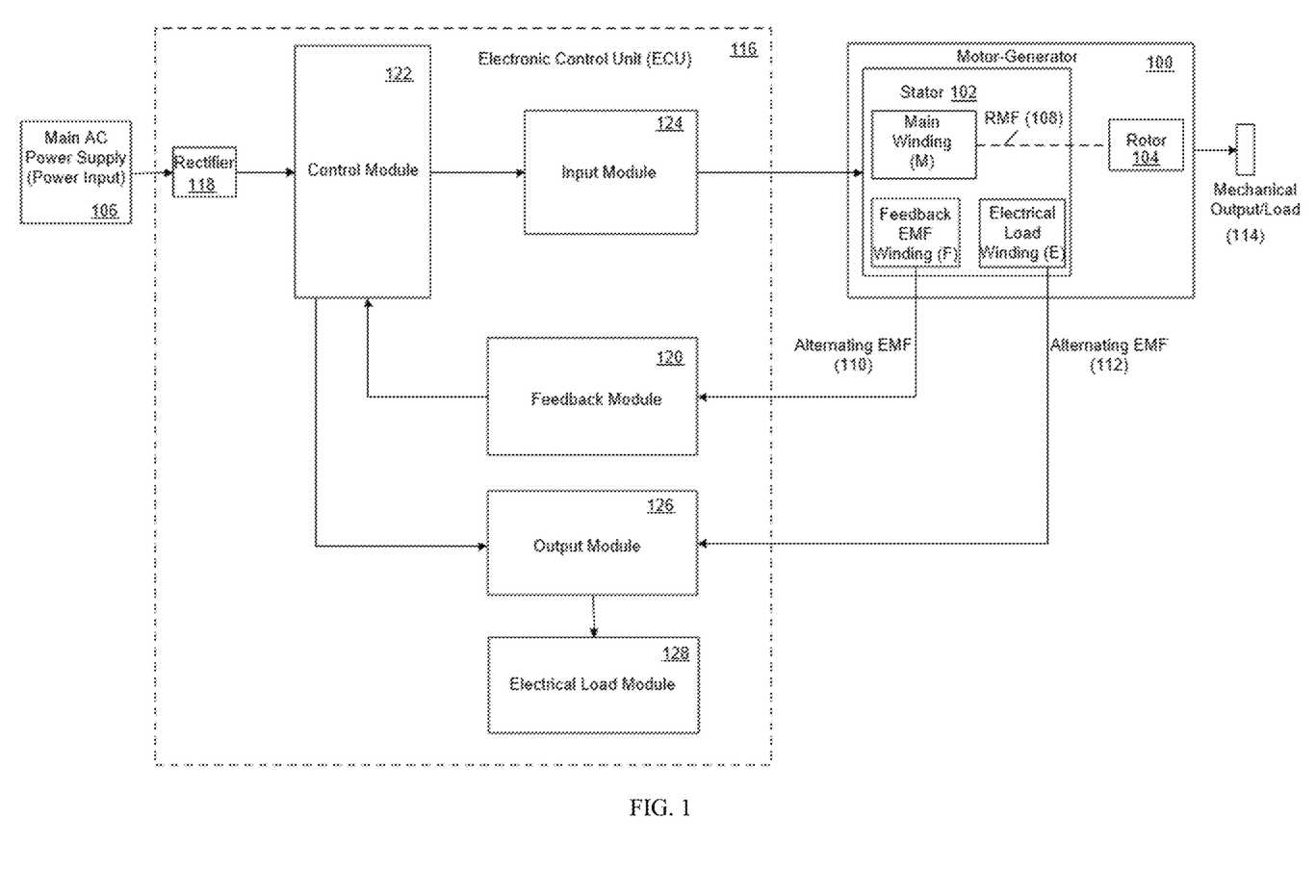
FIG. 1 is a diagrammatic representation of an energy efficient motor-generator in accordance with the present disclosure.

FIG. 1 is a diagrammatic representation of an energy efficient motor-generator in accordance with the present disclosure. Referring to FIG. 1, there is shown a motor-generator 100 comprising a stator 102 and a rotor 104, a main AC power supply 106, a main winding (M) of the stator 102, a first additional winding (F) and a second additional winding (E) of the stator 102, a rotating magnetic field (RMF) 108 generated in the main winding (M), an alternating EMF 110 produced in the first additional winding (F), an alternating EMF 112 produced in the second additional winding (E), a mechanical load 114, an electronic control unit (ECU) 116 which includes a rectifier 118, a feedback module 120, a control module 122, an input module 124, an output module 126, and an electrical load module 128.

The motor-generator 100 includes the stator 102 that includes the main winding (M) for generating the rotating magnetic field (RMF) 108 upon providing the main AC power supply 106 to the main winding of the stator 102 and a rotor 104 disposed to rotate relative to the main winding (M) of the stator 102 due to the RMF 108. The stator 102 includes two additional windings namely the first additional winding (F) and the second additional winding (E). Each one of the windings M, E and F may be multi-layered windings with single or multiple coils. Each coil may be made of a single core wire or multicore wires.

The first additional winding (F), also referred to as a feedback EMF winding (F), produces the alternating EMF 110 which is induced in the feedback EMF winding (F) due to the rotation of the rotor 104. The alternating EMF 110 produced in the feedback EMF winding (F) is then harvested, manipulated and fed back simultaneously to the main winding (M) of the stator 102 throughout the complete rotation cycle of the rotor through the ECU 116 interfaced to the stator 102. The energy thus produced during the rotation of the rotor 104 yields a substantial portion of the energy requirement of the motor-generator 100.

The ECU 116 includes the feedback module 120, the control module 122, and the input module 124 for harvesting the alternating EMF 110 produced in the feedback EMF winding (F). The rectifier 118 converts the AC power from the main AC power supply 106 to DC power which is then fed to the control module 122. The alternating EMF 110 produced in the feedback EMF winding (F) is fed to the feedback module 120 which converts the AC power of the alternating EMF 110 to DC power and feeds the DC power to the control module 122.

The control module 122 is a component of the ECU 116 that combines the input voltages of the main AC power supply 106 and the feedback module 120 to generate a resultant DC power. The control module 122 checks the value of the input voltage from the feedback module 120 against the desired operational voltage of the motor-generator 100. Accordingly, the control module 122 adds the remaining voltage from the power obtained from the main AC power supply 106.

The resultant DC power from the control module 122 is fed to the input module 124. The input module 124 converts the resultant DC power to a resultant AC power, filters and feeds the resultant AC power to the main winding (M) of the stator 102.

The second additional winding (E) in the stator 102, also referred to as an electrical load EMF winding (E), produces the alternating EMF 112 which is induced in the electrical load EMF winding (E) due to the rotation of the rotor 104. The alternating EMF 112 produced in the electrical load EMF winding (E) is then harvested through the ECU 116 interfaced to the stator 102 to supply power to an electrical load. The energy thus produced during the rotation of the rotor 104 meets the energy requirements to drive the electrical load.

The ECU 116 includes the control module 122, the output module 126 and the electrical load module 128 for harvesting the alternating EMF 112 produced in the electrical load EMF winding (E). The control module 122 communicates with the output module 126 and controls different components and circuits of the output module 126. The alternating EMF 112 produced in the electrical load EMF winding (E) is fed to the output module 126 which converts the AC power of the alternating EMF 112 to DC power which charges and triggers a battery to supply power to the electrical load module 128 which provides an electrical output to power an electrical load.

Figure 2:
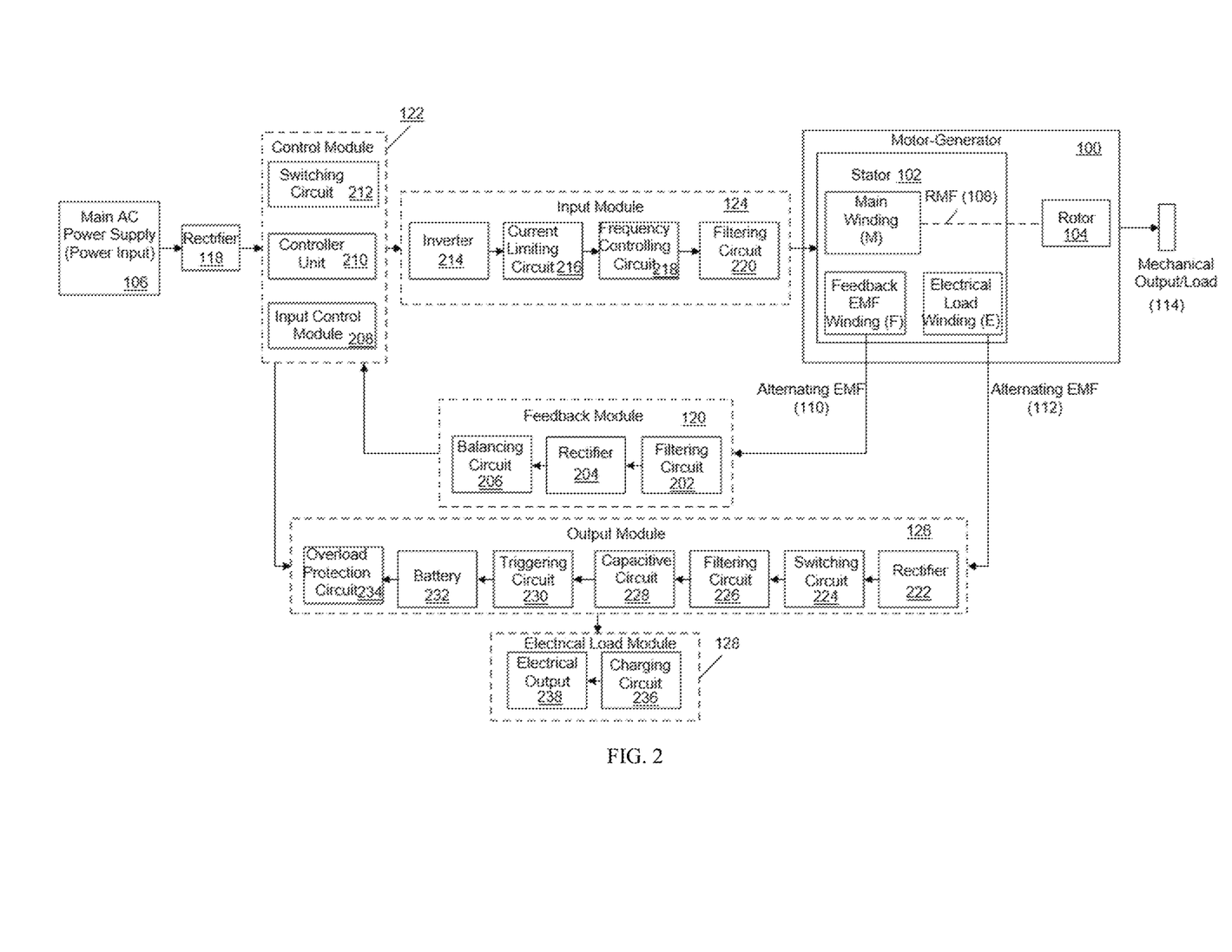
FIG. 2 is a diagrammatic representation of the operation of the energy efficient motor-generator of FIG. 1.

FIG. 2 illustrates the high-level operation of the energy efficient motor-generator of FIG. 1. Referring to FIG. 2, there is shown the feedback module 120, which can include a filtering circuit 202, a rectifier 204, and a balancing circuit 206. There is also shown the control module 122, which can include an input control module 208, a controller unit 210, and a switching circuit 212. The input module 124 is shown to include an inverter 214, a current limiting circuit 216, a frequency controlling circuit 218, and a filtering circuit 220. The output module 126 is shown to include a rectifier 222, a switching circuit 224, a filtering circuit 226, a capacitive circuit 228, a triggering circuit 230, a battery 232, and an overload protection circuit 234. The electrical load module 128 can include a charging circuit 236 and an electrical output 238.

The ECU 116 includes the feedback module 120, the control module 122, and the input module 124 for harvesting the alternating EMF 110 produced in the feedback EMF winding (F).

The feedback module 120 further includes the filtering circuit 202, the rectifier 204 and the balancing circuit 206. The filtering circuit 202 stabilizes the alternating EMF 110 produced in the feedback EMF winding (F). The output from the filtering circuit 202 is fed to the rectifier 204 which converts the AC power of the alternating EMF 110 to DC power or voltage. The DC power or voltage output from the rectifier 204 is fed to the balancing circuit 206. The balancing circuit 206 stabilizes or maintains the DC power or voltage output from the rectifier circuit 204. The DC power or voltage output from the feedback module 120 is fed to the control module 122.

The control module 122 includes the input control module 208, the controller unit 210 and the switching circuit 212. The input control module 208 provides the working voltage for the control module 122 and controls any sudden variation in the input voltage or control. Further, the input control module 208 maintain the input voltage when there are fluctuations in one or more electrical parameters that may include, but are not limited to, the current, voltage and the power factor. The control module 122 receives output of the feedback module 120 and detects any errors in the output of the feedback module 120. Upon detecting any errors, the control module 122 solves those errors and controls the input from the feedback module 120.

The controller unit 210 can be implemented in firmware, and is responsible for operation of the control module 122. The controller unit 210 initially provides one or more instructions to the switching circuit 212. The main function of the controller unit 210 is to control the timing of the switching action of the switching circuit 212 and maintain the proper desired voltage to the input module 124. The desired voltage is provided by comparing the input voltage from the main AC power supply 106 and the alternating EMF 110 which is the feedback energy input. This voltage is captured and compared by the controller unit 210. In certain embodiments, all the functions of the ECU 116 can be controlled by the controller unit 210.

The switching circuit 212 drives the input module 124. The switching circuit 212 receives as one of the inputs the alternating EMF 110 as feedback from the balancing circuit 206. The other input to the switching circuit 212 is the line input or input voltage from the main AC power supply 106.

The switching circuit 212 receives output power from the balancing circuit 206. This output power from the balancing circuit 206 is not enough for the working of the motor-generator 100. Therefore, the controller unit 210 receives the required remaining power from the input control module 208 for the proper working of the motor-generator 100.

The controller unit 210 adds the remaining power from the input control module 208 to the switching circuit 212 for the working of the motor-generator 100. The desired power for the working of the motor-generator 100 is delivered from the switching circuit 212 with the help of the controller unit 210 after the summation of the two input powers namely the output power from the balancing circuit 206 and the remaining power from the input control module 208.

The controller unit 210 checks the value of power from the balancing circuit 206 with the desired value of power required for the working of the motor-generator 100. The remaining power is added from the input control module 208. Once the desired value of power is reached, the switching circuit 212 switches into the inverter 214 of the input module 124.

The input module 124 is the input section of the motor-generator 100 that includes the inverter 214, the current limiting circuit 216, the frequency controlling circuit 218 and the filtering circuit 220. The switching circuit 212 drives the input module 124 through the inverter 214 and the frequency controlling circuit 218.

The inverter 214 is a component of the input module 124. The inverter 214 receives input DC voltage from the control module 122 and converts the DC voltage to AC voltage or supply for the working of the motor-generator 100. The controller unit 210 controls or guides the switching of the inverter 214.

The current limiting circuit 216 limits the excess current from the inverter 214. The frequency controlling circuit 218 provides the required frequency range for the working of the motor-generator 100. The frequency controlling circuit 218 also maintain this frequency range without any fluctuations.

The filtering circuit 220 includes an inductive-capacitive LC filter. The filtering circuit 220 filters or remove harmonics in the voltage to provide pure AC supply to the stator 102 for the working of the motor-generator 100.

The ECU 116 includes the control module 122, the output module 126 and the electrical load module 128 for harvesting the alternating EMF 112 produced in the electrical load EMF winding (E).

The output module 126 includes the rectifier 222, the switching circuit 224, the filtering circuit 226, the capacitive circuit 228, the triggering circuit 230, the battery 232 and the overload protection circuit 234.

The rectifier 222 converts the AC power or voltage of the alternating EMF 112 produced in the electrical load EMF winding (E) into DC power or voltage.

The switching circuit 224 receives the rectified output from the rectifier 222. In certain embodiments, the switching circuit 224 may be operated only when the required constant DC voltage is provided as input to the switching circuit 224. Since the variations of the speed in the motor-generator 100 may affect the load, the switching circuit 224 is used to maintain the constant voltage.

The filtering circuit 226 filters the generated DC output to pure DC power.

The capacitive circuit 228 stores the DC input voltage and triggers the battery 232 via the triggering circuit 230, when the capacitive circuit 228 has enough energy. The purpose of the capacitive circuit 228 is to charge the battery by supplying the stored energy. The battery 232 stores the energy.

The triggering circuit 230 triggers the battery 232 based on determining under-voltage and over-voltage conditions to help protect the motor-generator 100. For instance, during under-voltage conditions, the triggering circuit 230 engages the battery 232 to provide energy. During over-voltage conditions, the triggering circuit 230 disconnects or disengages the battery 232.

The overload protection circuit 234 is operative during an overload condition. The overload protection circuit 234 detects an over current or a high temperature and accordingly triggers protection of the circuit from an overload condition. Further, the overload protection circuit 234 protects the charging circuit 236 from over charging and prevents short circuit of the battery 232.

The electrical load module 128 includes the charging circuit 236 and the electrical output 238. The charging circuit 236 charges the battery 232 at a nominal voltage. The electrical output 238 is the output section where the electrical load is to be connected.

Figure 3:
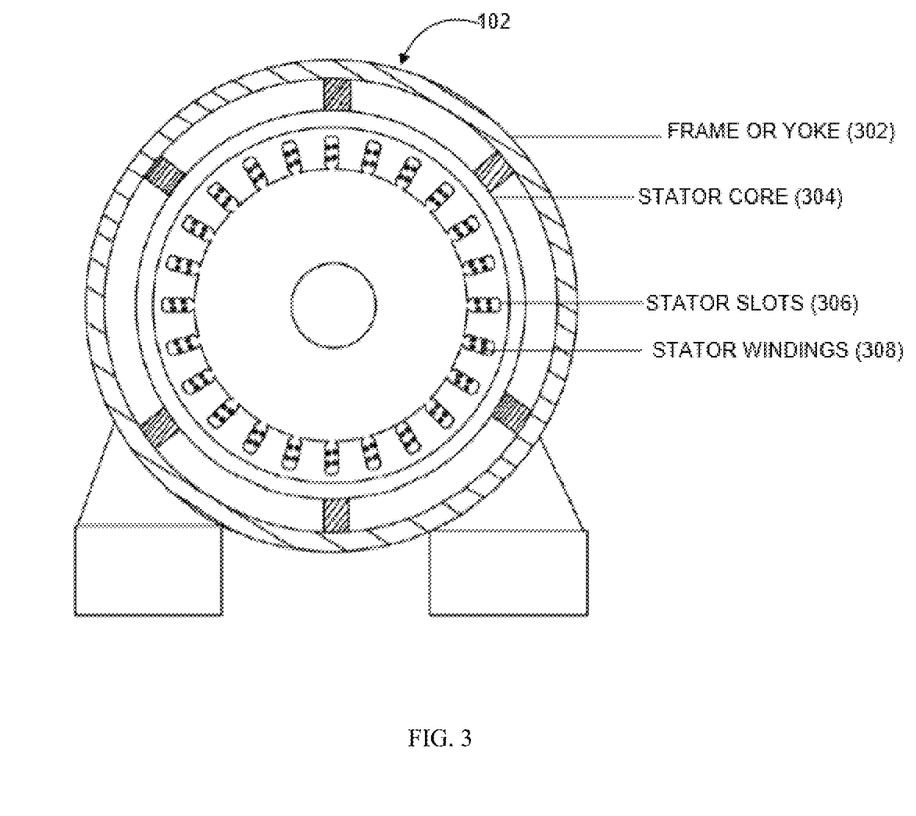
FIG. 3 is a schematic representation of a stator of an energy efficient motor-generator.

FIG. 3 is a schematic representation of a stator 102 of an energy efficient motor-generator in accordance with the present disclosure. Referring to FIG. 3, the stator 102 is shown to includes a frame or yoke 302, a stator core 304, stator slots 306 and stator windings 308.

The frame or yoke 302 forms an integral part of the stator 102. A main function of the frame or yoke 302 is to provide a protective cover for other sophisticated components or parts of the motor-generator 100.

The stator core 304 is made up of laminations which include the stator slots 306. The space provided in each of the stator slots 306 is slightly more than that of a conventional slot to accommodate the stator windings 308 that include one or more sets of winding wires. The winding wires are insulated wires and can be any type of insulating wire known to one skilled in the art. The size of the stator slots 306 may be adjusted and maintained for uniform distribution of the stator windings 308. A number of slots, poles, and windings of the stator 102 can be predetermined parameters or, in certain embodiments, may be configurable parameters or vary based on an intended application.

The space provided in the stator slots 306 is slightly more than the conventional slots so as to accommodate the one or more sets of winding wires which include the main winding (M) which carries the supply power/energy (RMF 108) for rotating the rotor 104 and the two additional windings (F) and (E), the first additional winding (F) which is used for transmission of the power (alternating EMF 110) induced in the first additional winding (F) while the rotor 104 is rotating and the second additional winding (E) which is used for transmission of the power (alternating EMF 112) induced in the second additional winding (E) while the rotor 104 is rotating.

Further, the stator 102 can include a machined rabbet and/or bore to maintain a uniform air gap. A shaft and plurality of bearings used in the stator 102 of the motor-generator 100 can be of any type known to one skilled in the art. A ball bearing of suitable size is used to reduce rotational friction and support radial and axial loads. A fan is provided to enable adequate circulation of air to cool the stator windings 308. The heat produced in the motor-generator 100 is comparatively less because of less current consumption and due to mutually opposite working of the stator windings 308 namely, the main winding (M) corresponding to supply power/energy (RMF 108) for rotating the rotor 104 and the two additional windings (F) and (E) corresponding to transmission of the alternating EMF 110 and alternating EMF 112 respectively while the rotor 104 is rotating. Therefore, a size of the cooling fan can also be reduced, thus saving some energy on that count. The bearings are housed at the end of the shaft and are fixed to the frame or yoke 302.

A number of poles and a number of windings of the stator 102 can be determined based on the speed of the motor-generator 100 as the synchronous speed is directly proportional to frequency and inversely proportional to the number of poles according to the equation $$N_s = 120\frac{f}{P}$$

wherein '$N_s$' is the synchronous speed, 'f' is the frequency and 'P' is the number of poles.

In accordance with the preferred embodiment of the present disclosure, the stator 102 is provided with a total of 24 slots as required for 6 poles, each pole having 4 slots. Every slot is provided with three winding wires, the main winding (M) corresponding to supply power/energy (RMF 108) for rotating the rotor 104, the first additional winding (F) which is used for transmission of the power (alternating EMF 110) induced in the first additional winding (F) while the rotor 104 is rotating and the second additional winding (E) which is used for transmission of the power (alternating EMF 112) induced in the second additional winding (E) while the rotor 104 is rotating. Respective terminal ends of these windings are connected to the ECU 116.

Figure 4:
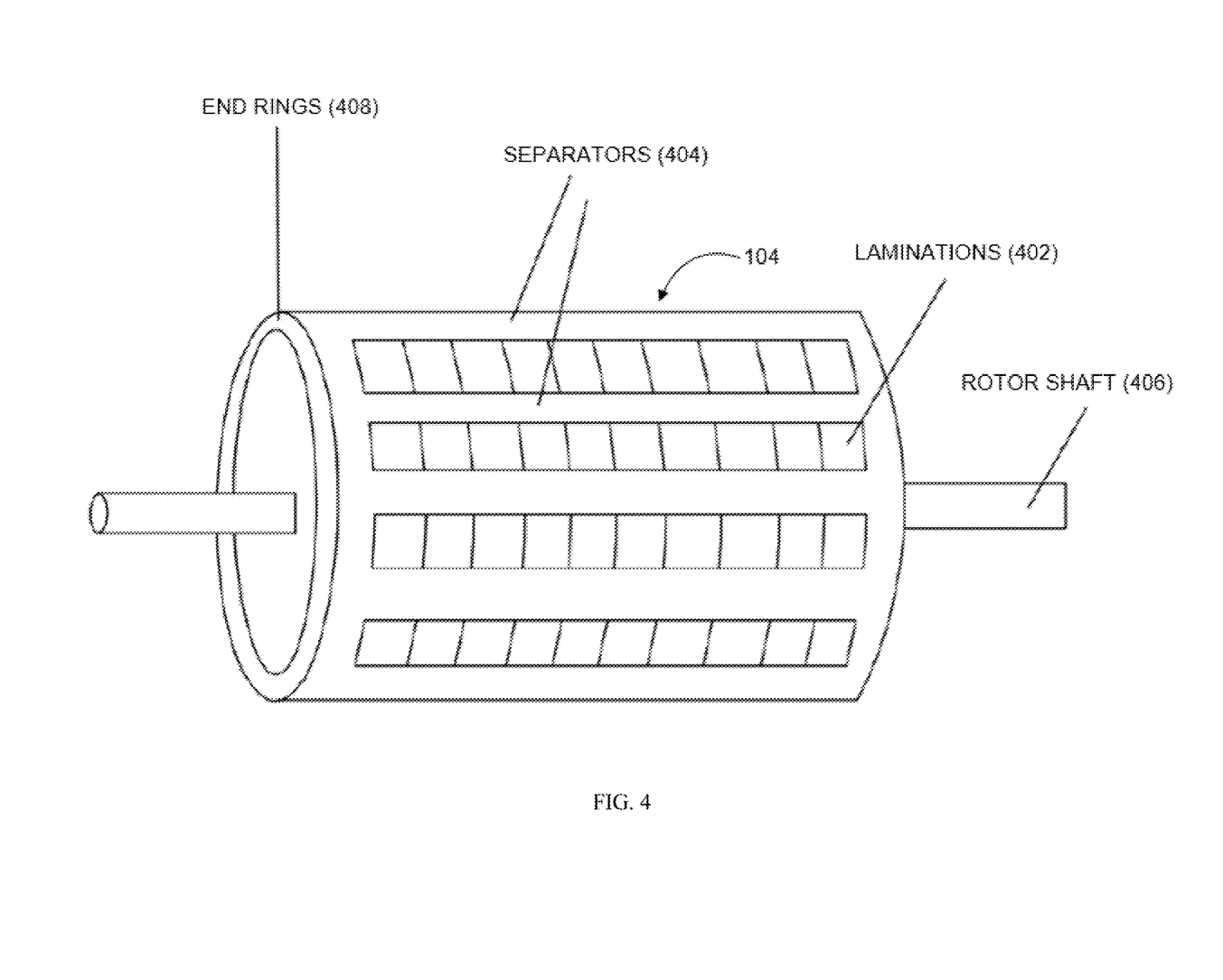
FIG. 4 is a schematic representation of a rotor of an energy efficient motor-generator.

FIG. 4 is a schematic representation of a rotor 104 of an energy efficient motor-generator. Referring to FIG. 4, the rotor 104 is shown to include laminations 402, separators 404, a rotor shaft 406 and end rings 408.

In this particular embodiment, the rotor 104 is a squirrel cage type rotor. The rotor 104 includes a cylinder of the laminations 402, with the separators 404 for separating the laminations 402 of the rotor 104. In some embodiments, the rotor 104 may include highly conductive materials or metals that may include, but are not limited to, aluminum, copper, ferrite, iron or any other material embedded into its surface, parallel or approximately parallel to the rotor shaft 406 and close to the surface of the rotor 104. At both ends of the rotor 104, rotor conductors are short-circuited by the continuous end rings 408 of similar materials to that of the rotor conductors. The rotor conductors and their end rings 408 by themselves form a complete closed circuit.

When an alternating current is run through the stator windings 308, the RMF 108 is produced. This induces a current in the rotor windings, which produces its own magnetic field. The interaction of the magnetic fields produced by the stator and rotor windings produces a torque on the rotor 104.

The RMF 108 induces voltage in the rotor bars which causes short-circuit currents to start flowing in the rotor bars. These rotor currents generate their self-magnetic field which interacts with the RMF 108 of the stator 102. The rotor field will try to oppose its cause, which is the RMF 108. Therefore, the rotor 104 starts following the RMF 108. The moment the rotor 104 catches up with the RMF 108, the rotor current drops to zero as there is no more relative motion between the RMF 108 and the rotor 104. Hence, when the rotor 104 experiences zero tangential force, the rotor 104 decelerates for the moment. After deceleration of the rotor 104, the relative motion between the rotor 104 and the RMF 108 is reestablished, and consequently, a rotor current is induced again. Thus, the tangential force for rotation of the rotor 104 is restored again, and the rotor 104 starts rotating again following the RMF 108. In this way, the rotor 104 maintains a constant speed which is less than the speed of the RMF 108 or the synchronous speed (Ns).

Figure 5:
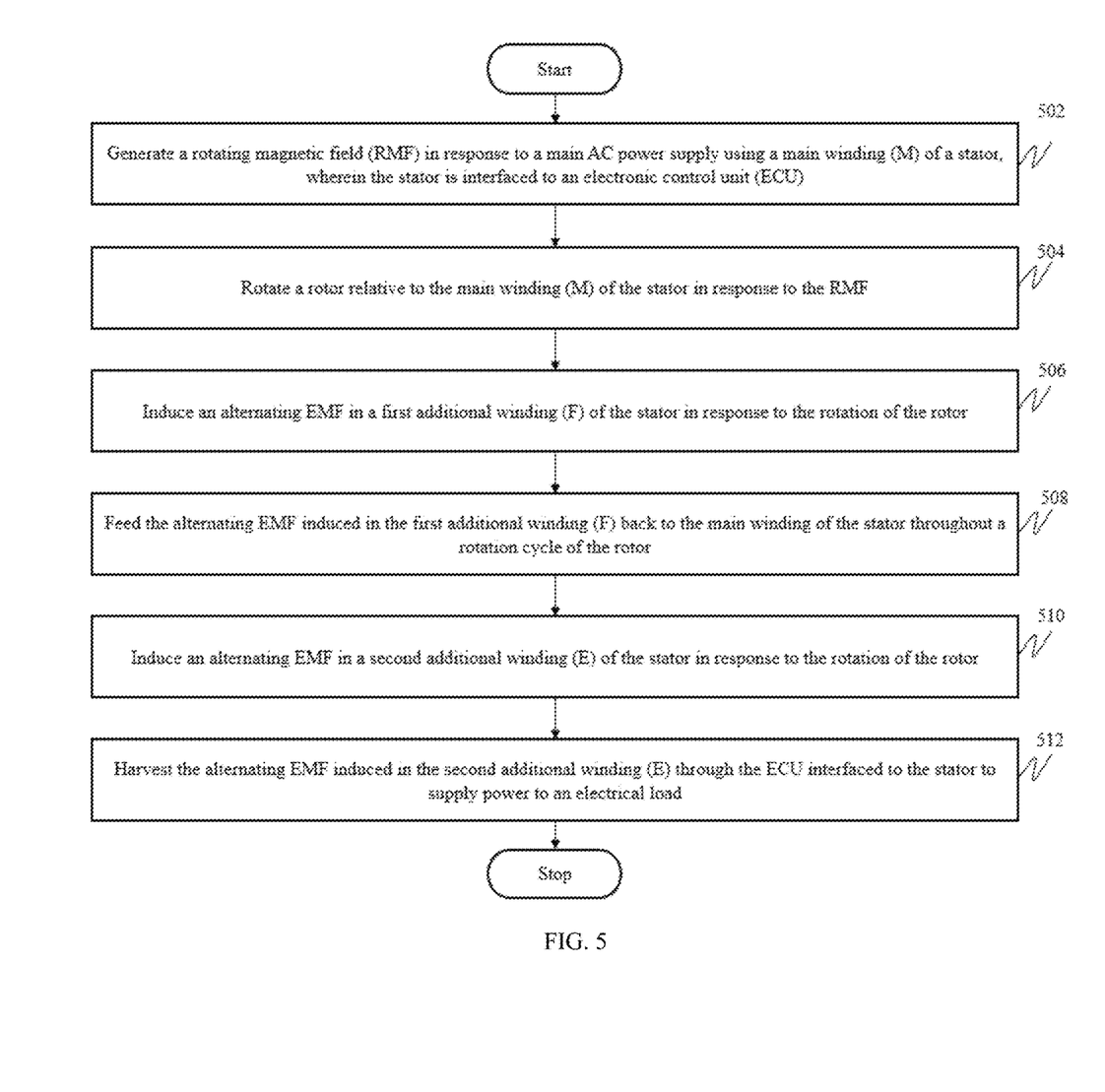
FIG. 5 illustrates a flowchart of a method for operating the energy efficient motor-generator in accordance with the present invention.

FIG. 5 is a flowchart of a method for operating an energy efficient motor-generator 100 in accordance with the present invention. Referring to FIG. 5, there is shown a flowchart of a method 500 for operating the energy efficient motor-generator 100.

As illustrated in FIG. 5, at step 502, a rotating magnetic field (RMF) is generated in response to a main AC power supply 106 using the main winding (M) of the stator 102, wherein the stator 102 is interfaced to an electronic control unit (ECU) 116.

The motor-generator 100 includes the stator 102 that includes the main winding (M) for generating the rotating magnetic field (RMF) 108 upon providing the main AC power supply 106 to the main winding (M) of the stator 102.

At step 504, the rotor 104 is rotated relative to the main winding (M) of the stator 102 in response to the RMF 108. The stator 102 includes two additional windings namely the first additional winding (F) and the second additional winding (E). Each one of the windings M, E and F may be multi-layered windings with single or multiple coils. Each coil may be made of a single core wire or multicore wires.

At step 506, an alternating EMF 110 in the first additional winding (F) of the stator 102 is induced in response to the rotation of the rotor 104.

The alternating EMF 110 produced in the electrical load EMF winding (E) is then harvested through the ECU 116 interfaced to the stator 102 to supply power to an electrical load.

At step 508, the alternating EMF 110 induced in the first additional winding (F) is fed back to the main winding (M) of the stator 102 throughout a rotation cycle of the rotor 104.

The alternating EMF 110 produced in the feedback EMF winding (F) is then harvested, manipulated and fed back simultaneously to the main winding (M) of the stator 102 throughout the rotation cycle of the rotor 104 through the ECU 116 interfaced to the stator 102.

The energy thus produced during the rotation of the rotor 104 yields a substantial portion of the energy requirement of the motor-generator 100. The energy thus produced during the rotation of the rotor 104 yields a substantial portion of the energy requirement of the motor-generator 100.

At step 510, an alternating EMF 112 in the second additional winding (E) of the stator 102 is induced in response to the rotation of the rotor 104.

The alternating EMF 112 produced in the electrical load EMF winding (E) is then harvested through the ECU 116 interfaced to the stator 102 to supply power to an electrical load At step 512, the alternating EMF 112 induced in the second additional winding (E) is harvested through the ECU 116 interfaced to the stator 102 to supply power to the electrical load 128.

The alternating EMF 112 produced in the electrical load EMF winding (E) is then harvested through the ECU 116 interfaced to the stator 102 to supply power to an electrical load. The energy thus produced during the rotation of the rotor 104 meets the energy requirements to drive the electrical load.

The motor-generator of the present disclosure is advantageous in that it provides an energy efficient motor-generator that has wide industrial applicability due to its reliability in performance compared to other conventional AC motors. The energy efficient motor-generator reduces the consumption of electricity to a large extent and provides monetary benefits in agricultural sectors, locomotive sectors, and other industries which widely use induction motors.

The energy efficient motor-generator consumes less power, by implementing an exclusively designed electronic module coupled with a tailor-made stator winding design, for ensuring higher power efficiency.

The present disclosure provides an energy efficient motor-generator which consumes less power, compared to the conventional motor of the same capacity because of the implementation of the winding provided in the stator, which is capable of generating definite EMF (alternating EMF) while the motor is rotating, so that part of the power requirement for driving the motor is met while running the motor. The disclosed motor-generator also makes it possible to use a single-phase induction motor instead of a three-phase induction motor, without compromising on the input power requirement.

The present disclosure provides an energy efficient single-phase or multi-phase motor-generator which is used to supply power to drive electrical loads because of the implementation of the winding provided in the stator, which is capable of generating definite EMF (alternating EMF) while the motor is rotating. Thus, the motor-generator of the present disclosure includes a single system that is capable of producing both mechanical and electrical power.

Further, the single-phase or multi-phase (for example, three-phase) induction motor may be built using a permanent magnet and has lower electrical, magnetic and heat losses.

Furthermore, the energy efficient motor-generator has reduced number of components, thus improving reliability and is a space saving design due to integrated electrical and mechanical generator in a single system.

The energy efficient motor-generator also has a simple cooling system design due to low thermal and mechanical (vibrational, frictional) losses and due to low harmonics, the associated electrical system design of the energy efficient motor-generator is simpler.

Those skilled in the art will realize that the above recognized advantages and other advantages described herein are merely exemplary and are not meant to be a complete rendering of all of the advantages of the various embodiments of the present disclosure.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system, may control the computer system such that it carries out the methods described herein. The present disclosure may be realized in hardware that comprises a portion of an integrated circuit that also performs other functions. The present disclosure may also be realized as a firmware which form part of the media rendering device.

The present disclosure may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

In the foregoing specification, specific embodiments of the present disclosure have been described. However, one of ordinary skill in the art appreciates that various modifications and changes can be made without departing from the scope of the present disclosure. Accordingly, the specification and figures are to be regarded in an illustrative rather than a restrictive sense, and all such modifications are intended to be included within the scope of the present disclosure.

What is claimed is:

1. A motor-generator, comprising:
 a stator comprising a main winding configured to generate a rotating magnetic field (RMF) upon providing a main AC power supply to the main winding of the stator;
 an electronic control unit (ECU) interfaced to the stator; and
 a rotor disposed to rotate relative to the main winding of the stator due to the RMF, wherein:
 the stator further comprises a first additional winding and a second additional winding, wherein a rotation of the rotor induces an alternating EMF in the first additional winding of the stator, wherein the alternating EMF induced in the first additional winding is fed back to the main winding of the stator throughout a rotation cycle of the rotor,
 wherein the rotation of the rotor further induces an alternating EMF in the second additional winding of the stator, wherein the alternating EMF induced in the second additional winding is harvested through the ECU interfaced to the stator to supply power to an electrical load.

2. The motor-generator of claim 1, wherein the stator includes laminations comprising a plurality of stator slots, each stator slot of the plurality of stator slots comprising one or more sets of winding wires, each set including the main winding, the first additional winding and the second additional winding.

3. The motor-generator of claim 1, wherein the ECU comprises a feedback module configured to receive the alternating EMF induced in the first additional winding, wherein the feedback module converts AC power of the alternating EMF to DC power.

4. The motor-generator of claim 3, wherein the feedback module comprises a filtering circuit configured to stabilize the alternating EMF induced in the first additional winding.

5. The motor-generator of claim 3, wherein the feedback module comprises a rectifier configured to convert AC power of the alternating EMF induced in the first additional winding to DC power.

6. The motor-generator of claim 5, wherein the feedback module comprises a balancing circuit configured to stabilize the DC power output from the rectifier.

7. The motor-generator of claim 3, wherein the ECU further comprises a rectifier circuit configured to convert AC power from the main AC power supply to DC power, and a control module configured to combine the DC power from the rectifier circuit and the DC power from the feedback module to generate a resultant DC power.

8. The motor-generator of claim 7, wherein the control module comprises an input control module connected to the feedback module, the input control module configured to provide an input voltage to the control module and to control a variation in the input voltage to the control module due to fluctuations in at least one of a current, a voltage, or a power factor.

9. The motor-generator of claim 8, wherein the control module further comprises a controller unit and a switching circuit, wherein the controller unit provides one or more instructions to the switching circuit to control timing of a switching action of the switching circuit and maintain a proper desired voltage to the input module.

10. The motor-generator of claim 9, wherein the switching circuit receives output power from the balancing circuit and wherein the controller unit receives a required remaining power from the input control module.

11. The motor-generator of claim 10, wherein the controller unit adds the remaining power from the input control module to the switching circuit for working of the motor-generator, wherein a desired power for the working of the motor-generator is delivered from the switching circuit with the help of the controller unit after a summation of the output power from the balancing circuit and the remaining power from the input control module.

12. The motor-generator of claim 1, wherein the ECU comprises a rectifier circuit configured to convert AC power from the main AC power supply to DC power, a feedback module configured to receive the alternating EMF induced in the first additional winding and to convert AC power of the alternating EMF to DC power, a control module configured to receive the DC power from the rectifier circuit and the feedback module and to combine input voltages of the main AC power supply and the feedback module to generate a resultant DC power, and an input module configured to receive the resultant DC power generated by the control module, wherein the input module converts the resultant DC power to a resultant AC power, and filters and feeds the resultant AC power to the main winding of the stator.

13. The motor-generator of claim 12, wherein the input module comprises an inverter configured to convert the DC voltage from the control module to AC voltage.

14. The motor-generator of claim 13, wherein the input module comprises a current limiting circuit to limit excess current from the inverter.

15. The motor-generator of claim 14, wherein the input module comprises a frequency controlling circuit to provide a required frequency range for the working of the motor-generator, wherein the frequency controlling circuit maintains the frequency range while suppressing fluctuations.

16. The motor-generator of claim 15, wherein the input module comprises a filtering circuit that includes an inductive-capacitive LC filter, wherein the filtering circuit filters harmonics in the voltage to provide pure AC supply to the stator for the working of the motor-generator.

17. The motor-generator of claim 12, wherein the ECU further comprises an output module configured to receive the alternating EMF induced in the second additional winding and to convert AC power of the alternating EMF to DC power which charges and triggers a battery to supply power.

18. The motor-generator of claim 17, wherein the output module comprises a rectifier, a switching circuit, a filtering circuit, a capacitive circuit, a triggering circuit, a battery and an overload protection circuit.

19. The motor-generator of claim 18, wherein the rectifier converts AC power of the alternating EMF produced in the second additional winding into DC power and wherein the switching circuit receives the DC power from the rectifier and maintains a constant voltage.

20. The motor-generator of claim 19, wherein the filtering circuit filters the generated DC power to pure DC power.

21. The motor-generator of claim 20, wherein the capacitive circuit stores the pure DC power from the filtering circuit and triggers the battery via the triggering circuit, based on determining under-voltage and over-voltage conditions.

22. The motor-generator of claim 21, wherein during under-voltage conditions, the triggering circuit engages the battery to provide energy and during over-voltage conditions, the triggering circuit disconnects or disengages the battery.

23. The motor-generator of claim 18, wherein the overload protection circuit, upon detecting an over current or a high temperature, triggers protection of the motor-generator circuit from an overload condition.

24. The motor-generator of claim 17, wherein the ECU further comprises an electrical load module configured to receive the power supplied by the battery to provide an electrical output to power the electrical load.

25. The motor-generator of claim 24, wherein the electrical load module comprises a charging circuit and an electrical output, wherein the charging circuit charges the battery at a required voltage and the electrical load is connected to the electrical output.

26. A method comprising:
generating a rotating magnetic field (RMF) in response to a main AC power supply using a main winding of a stator, the stator interfaced to an electronic control unit (ECU);
rotating a rotor relative to the main winding of the stator in response to the RMF;
inducing an alternating EMF in a first additional winding of the stator in response to the rotation of the rotor;
feeding back the alternating EMF induced in the first additional winding to the main winding of the stator throughout a rotation cycle of the rotor;
inducing an alternating EMF in a second additional winding of the stator in response to the rotation of the rotor; and harvesting the alternating EMF induced in the second additional winding through the ECU interfaced to the stator to supply power to an electrical load.

\* \* \* \* \*